UNITED STATES PATENT OFFICE.

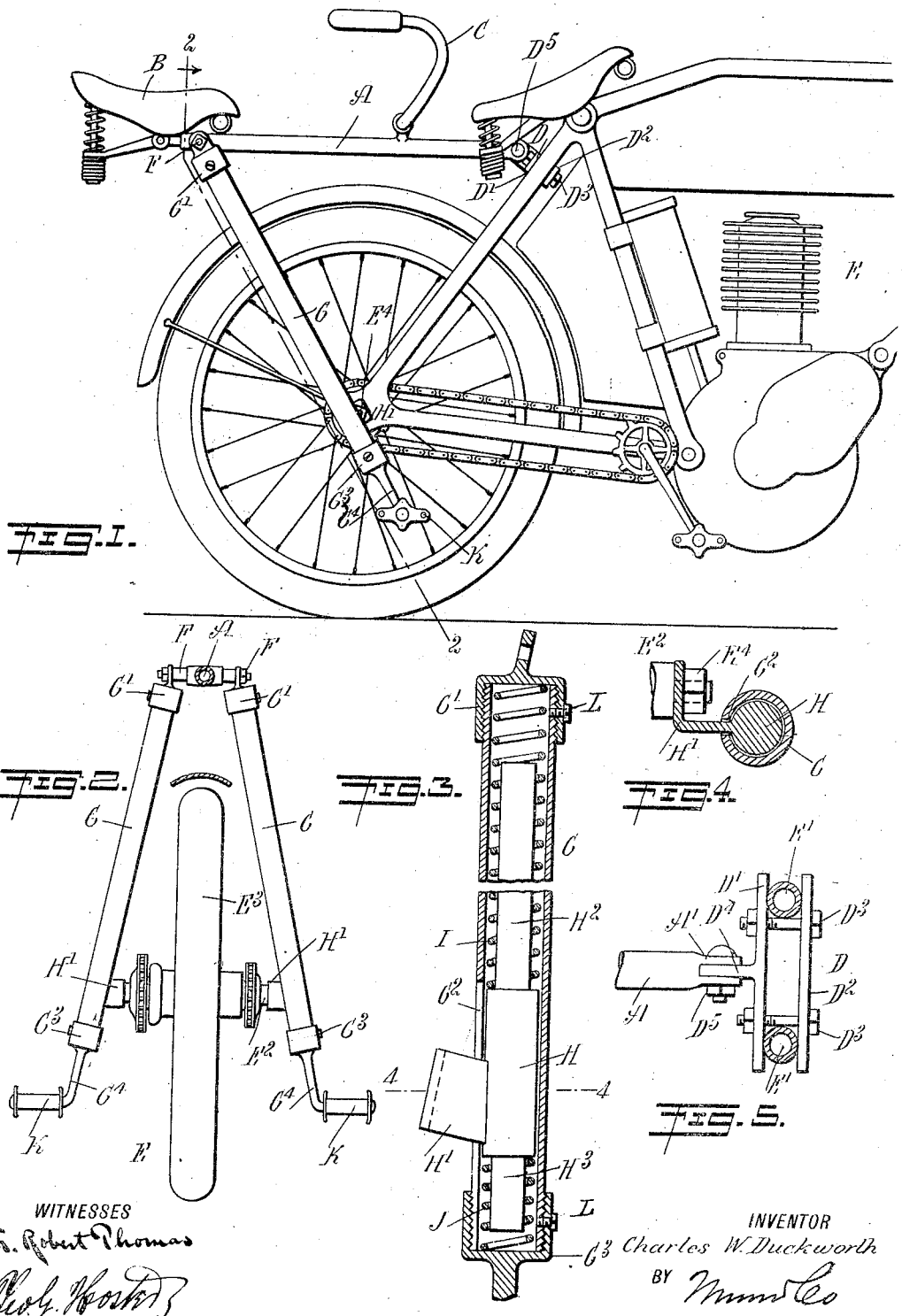

CHARLES W. DUCKWORTH, OF JACKSONVILLE, FLORIDA.

SUPPLEMENTAL-SEAT ATTACHMENT FOR MOTOR-CYCLES, BICYCLES, AND LIKE MACHINES.

1,050,722.　　　Specification of Letters Patent.　　Patented Jan. 14, 1913.

Application filed March 26, 1912. Serial No. 686,256.

*To all whom it may concern:*

Be it known that I, CHARLES W. DUCKWORTH, a citizen of the United States, and a resident of Jacksonville, in the county of Duval and State of Florida, have invented a new and Improved Supplemental-Seat Attachment for Motor-Cycles, Bicycles, and Like Machines, of which the following is a full, clear, and exact description.

The object of the invention is to provide a new and improved supplemental seat attachment for motor cycles, bicycles and like machines, and arranged to permit of conveniently and quickly fastening the attachment in position on the machines to support a second person. For the purpose mentioned, use is made of an auxiliary frame carrying a seat, foot rests and a handle bar, the auxiliary frame being pivotally connected at its forward upper end with the frame of the machine and being yieldingly supported from the rear axle of the machine.

A practical embodiment of the invention is represented in the accompanying drawings forming a part of this specification, in which similar characters of reference indicate corresponding parts in all the views.

Figure 1 is a side elevation of the attachment as applied to a motor cycle; Fig. 2 is a cross section of the same on the line 2—2 of Fig. 1, the seat being removed; Fig. 3 is an enlarged cross section of one of the stays; Fig. 4 is a sectional plan view of the same on the line 4—4 of Fig. 3; and Fig. 5 is a plan view of the clamping device connecting the front end of the auxiliary frame with the rear stays of the machine, the said rear stays being shown in section.

The auxiliary frame for supporting a second person is provided with a top bar $A$ provided at its rear end with a seat $B$, in front of which is arranged a handle bar $C$ attached to the top bar $A$ between the front and rear ends thereof. The forward end of the top bar $A$ is pivotally connected with a clamping device $D$ attached to the rear stays $E^1$ of the motor cycle, bicycle or other similar machine $E$, as plainly indicated in Figs. 1 and 5. The clamping device $D$ consists of transversely-extending clamping bars $D^1$ and $D^2$ between which pass the rear stays $E^1$, and the said clamping bars $D^1$ and $D^2$ are connected with each other by bolts $D^3$ for securely clamping the said bars $D^1$ and $D^2$ in position on the stays $E^1$. The clamping bar $D^1$ is provided with a rearwardly-extending lug $D^4$ through which passes a bolt $D^5$ also engaging the forward end $A^1$ of the top bar $A$ so as to pivotally connect the latter with the clamping device $D$. By the arrangement described the top bar $A$ is free to move up and down on the bolt $D^5$ as the fulcrum, but sidewise movement of the top bar is prevented by the lug $D^4$.

The rear end of the top bar $A$ is provided with a transversely-extending pivot pin $F$ pivotally connected with caps $G^1$ held on the upper ends of tubular stays $G$ extending downwardly, outwardly and forwardly on opposite sides of the rear axle $E^2$ and the rear wheel $E^3$ of the machine $E$, and in the said stays $G$ are loosely mounted blocks $H$ provided with brackets $H^1$ fastened by bolts or other means $E^4$ to the rear axle $E^2$ of the machine $E$. The brackets $H^1$ extend through slots $G^2$ formed in the tubular stays $G$, and each of the blocks $H$ is provided on its top with a rod $H^2$ extending to within a distance of the top cap $G^1$ and from the bottom of each block $H$ extends downwardly a rod $H^3$ reaching to within a short distance of the bottom cap $G^3$ of the corresponding tubular stay $G$. A spring $I$ is arranged within each stay $G$ and coiled around the upper rod $H^2$, and the top of the said spring $I$ abuts against the cap $G^1$. A spring $J$ is arranged in the lower part of each stay $G$ and is coiled around the rod $H^3$, and the top of this spring $J$ abuts against the under side of the block $H$ and the bottom of the spring rests on the cap $G^3$. By the arrangement described the rods $H^2$ and $H^3$ act as guides for the block $H$ when the latter moves up or down. The spring $I$ acts as a shock absorber while the spring $J$ takes up rebounds so as to insure easy riding of the person seated on the seat $B$. Each of the caps $G^1$ is provided with a downwardly-extending rod $G^4$ supporting a foot rest $K$ to permit the person seated on the seat $B$ to rest the foot on the rests $K$. The caps $G^1$ and $G^3$ are preferably secured in place by screws $L$ to prevent the caps from accidentally turning on the stay and thus avoid a possible binding of the bracket $H^1$ on the stay.

From the foregoing it will be seen that the attachment is very simple and durable in construction and can be readily attached to a motor cycle or a similar machine without making any alteration on such machine, and it will also be noticed that by supporting the auxiliary frame yieldingly from the rear axle E² of the machine as described, necessary provision is made for guarding against shocks and rebounds, thus insuring easy riding of the person seated on the seat B.

Having thus described my invention, I claim as new and desire to secure by Letters Patent:

1. An attachment for motor cycles, bicycles and like machines, comprising an auxiliary frame carrying a seat, foot rests and a handle bar, and adapted to be pivotally connected at its forward end to the frame of the machine, tubular stays forming part of said frame and each having a slot in one side thereof, and spring-pressed members mounted to slide in said stays and provided with brackets extending through the said slots and adapted to be connected with the rear axle of the machine.

2. An attachment for motor cycles, bicycles and like machines comprising a top bar, means for pivotally connecting the front end of said top bar to the frame of the machine, tubular supporting stays pivotally connected at their upper ends with the rear end of the said top bar, the said stays being each provided with a slot in one side, spring-pressed members mounted to slide in said stays, and provided with means extending through said slots for connection with the rear axle of the machine, foot rests on the lower ends of the said stays, a seat on the rear end of the said top bar, and a handle bar on the said top bar in front of the said seat.

3. A tandem attachment for motor cycles, bicycles and like machines, comprising a top bar, a clamping device adapted to be clamped to the rear upper end of the frame of the machine, the forward end of the said top bar being pivotally connected with the said clamping device, a seat on the rear end of the said top bar, a handle bar mounted on the said top bar in front of the said seat, tubular stays pivotally connected with the rear end of the said top bar, brackets adapted to be attached to the rear axle of the machine and provided with blocks mounted to slide in the said tubular stays, and springs in each of the said tubular stays and engaging the corresponding block on top and bottom.

4. A tandem attachment for motor cycles, bicycles and like machines, comprising a top bar, a clamping device adapted to be clamped to the rear upper end of the frame of the machine, the forward end of the said top bar being pivotally connected with the said clamping device, a seat on the rear end of the said top bar, a handle bar mounted on the said top bar in front of the said seat, tubular stays pivotally connected with the rear end of the said top bar, brackets adapted to be attached to the rear axle of the machine and provided with blocks mounted to slide in the said tubular stays, rods on each block and extending from the top and bottom thereof, the rods terminating at their ends a distance from the ends of the stays, coiled springs in the said stays and coiled around the said rods, and foot rests supported on the lower ends of the said stays.

5. A tandem attachment for motor cycles, bicycles and like machines provided with an auxiliary frame comprising a top bar, tubular stays having slots near their lower ends and connected with the said top bar, brackets adapted to be attached to the rear axle of the machine and extending through the said slots, blocks on the said brackets and mounted to slide in the said stays at the inside thereof, rods extending from the top and bottom of each block, and springs coiled on the said rods and pressing the said blocks at top and bottom, the ends of the springs abutting against the ends of the corresponding stay.

6. An attachment for motor cycles, bicycles and like machines, comprising an auxiliary frame having a top bar adapted to be pivotally connected at its forward end to the frame of the machine, tubular stays having slots near their lower ends and pivotally connected at their upper ends with the rear end of said top bar, and spring pressed blocks mounted to slide in the said stays and having members extending through the slots and adapted to be secured to the rear axle of the machine.

7. An attachment for motor cycles, bicycles and like machines, comprising an auxiliary frame having a top bar carrying a seat and a handle bar, and adapted to be pivotally connected at its forward end to the frame of the machine, tubular stays having slots in their lower portions, caps secured on the ends of said stays, the caps at the upper ends of the stays being pivotally connected to the rear end of the top bar, blocks mounted to slide in the said stays and provided with brackets extending through the slots in the stays, the said brackets being adapted to be secured to the rear axle of the machine, springs in the said stays and pressing on the said blocks at the top and bottom thereof, and foot rests carried by the caps at the lower ends of the stays.

In testimony whereof I have signed my name to this specification in the presence of two subscribing witnesses.

CHARLES W. DUCKWORTH.

Witnesses:
JOHN Z. REARDON,
C. LYMAN SPENCER.